(12) United States Patent
Ito et al.

(10) Patent No.: US 6,726,883 B2
(45) Date of Patent: Apr. 27, 2004

(54) SPOTTING PIN (75) Inventors: Seiichiro Ito, Tokyo (JP); Mitsuhiro Tachibana, Tokyo (JP); Naoki Yokokawa, Tokyo (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 0 days.

(21) Appl. No.: 10/441,095

(22) Filed: May 20, 2003

(65) Prior Publication Data

US 2003/0223911 A1 Dec. 4, 2003

(30) Foreign Application Priority Data

May 30, 2002 (JP) ........................................ 2002-157982

(51) Int. Cl.[7] .............................. B41J 2/25; B41J 2/255
(52) U.S. Cl. ..................... 422/100; 101/368; 347/110; 400/124.29; 422/99; 436/180
(58) Field of Search .................. 422/99, 100; 436/180; 347/110; 101/368; 400/124.01, 124.29, 124.3

(56) References Cited

U.S. PATENT DOCUMENTS

| | | | | |
|---|---|---|---|---|
| 6,101,946 A | * | 8/2000 | Martinsky | 101/494 |
| 2003/0184611 A1 | * | 10/2003 | Kuo et al. | 347/20 |
| 2003/0194700 A1 | * | 10/2003 | Ito et al. | 435/6 |

FOREIGN PATENT DOCUMENTS

WO     WO 98/20019     * 5/1998

* cited by examiner

Primary Examiner—Jan M. Ludlow
(74) Attorney, Agent, or Firm—Reed Smith L.L.P.; Stanley P. Fisher, Esq.; Juan Carlos A. Marquez, Esq.

(57) ABSTRACT

Identically shaped spots can be formed sequentially and stably by a spotting pin comprising a bar-like plunger 20. Four projections each formed in the shape of a top portion of a quadrangular pyramid are formed on the head of the plunger 20. The apexes 21 of the quadrangular pyramids constituting the projections are located inside a virtual plane extending from the peripheral wall of the plunger.

8 Claims, 9 Drawing Sheets

SPOTTING PIN

BACKGROUND OF THE INVENTION

1. Technical Field

The present invention relates to a spotting pin for spotting solutions containing biomolecules on a support in the process of manufacturing biochips.

2. Background Art

Biochips are conventionally manufactured by spotting solutions containing biopolymers, such as multiple kinds of DNA, RNA, proteins, or oligonucleotides, on a support, such as a slide glass or a nylon membrane. In such a manufacturing process, spotting pins are used. Various kinds of spotting pins have been developed, including a split-type spotting pin capable of sequential spotting operations based on capillary action, such as that observed in a fountain pen tip. Another example is a solid-type spotting pin in which a spotting solution is caused to adhere to the pin tip before each stamping. The solid-type spotting pin is advantageous in that it is easy to wash and that it wastes less spotting solution. However, it has been difficult to sequentially create uniform spots and produce large quantities of biochips with uniform quality using the solid-type spotting pin. This problem is being overcome in recent years, as evidenced by JP Patent Publication (Kokai) No. 2000-15272 A1. This describes a spotting pin with a pin head on which a cross-shaped groove is formed in order to increase the amount of spotting solution that can adhere to the pin head.

Figure 12:
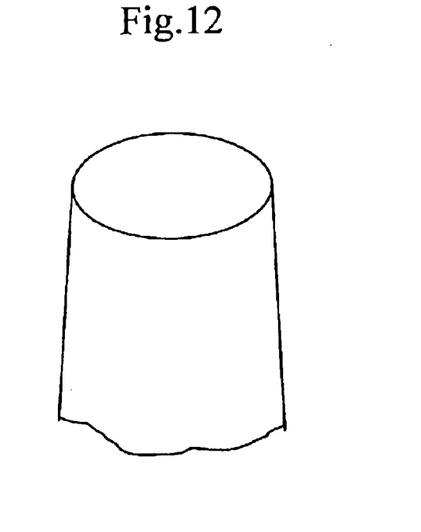
FIG. 12 shows a perspective view of a conventional flat-cut pin whose head is cut in parallel with the contact plane.
Figure 13:
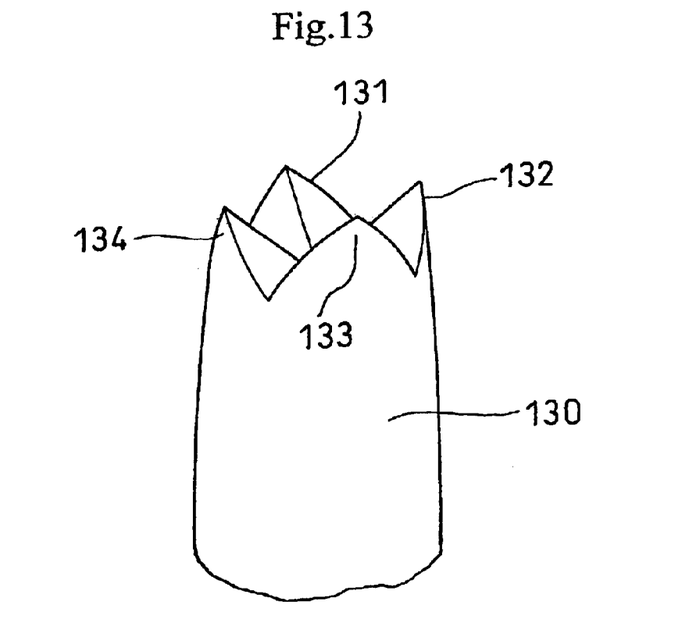
FIG. 13 shows a perspective view of the head of a conventional spotting pin (V-cut pin).
Figure 14:
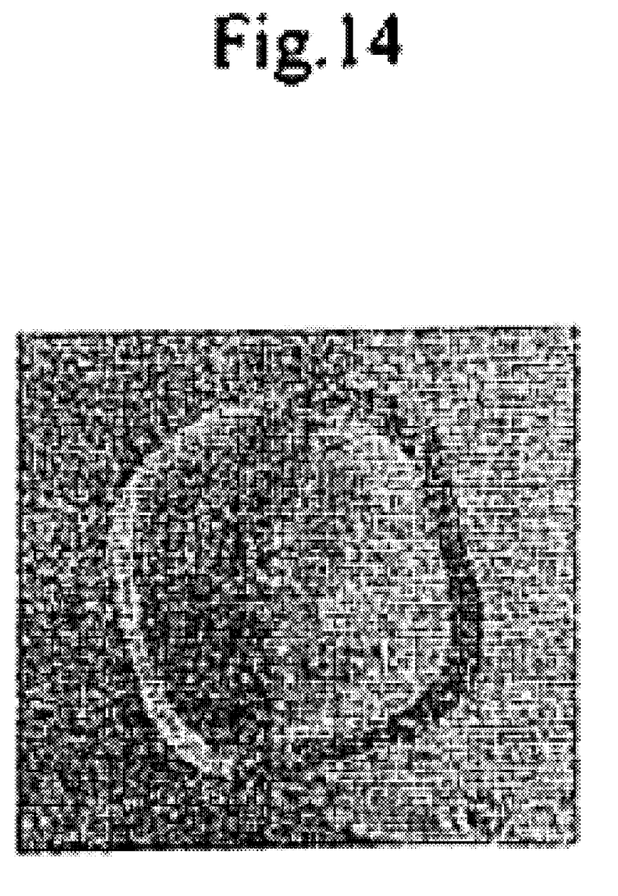
FIG. 14 shows a spot formed with the V-cut pin.

FIG. 12 is a perspective view of the tip of a conventional flat-cut pin that is cut in parallel to the contact surface. The flat-cut pin is used when spotting a solution on a water-absorbing support, such as a nylon membrane. It has the problem that it cannot create spots with circular edges and a stable shape if the spotting speed is high. FIG. 13 is a perspective view of the head of a conventional spotting pin (V-cut pin) in which two V-shaped grooves are formed in the shape of a cross on the head of the body, which is substantially cylindrical in shape, with each V having a wedge angle of 90°. The V-cut pin has four projections 131 to 134. The projections are substantially triangular-pyramidal in shape, each having an apex located on the external surface of a substantially cylindrical body 130. The V-cut pin forms a spot that tends look like a square, as shown in FIG. 14, and its shape is unstable. If identically shaped spots cannot be obtained, the reproducibility or analysis of an experiment utilizing a biochip may suffer.

Furthermore, there is a need for a technique that enables spots to be formed at high densities, because multiple kinds of biomolecules being spotted in a narrower area would not only allow large quantities of gene expression to be analyzed at once, for example, but would also help reduce the amount of samples used. For this purpose, a spotting pin is required that is capable of stamping small identically shaped spots in a stable manner.

SUMMARY OF THE INVENTION

It is therefore an object of the invention to provide a spotting pin capable of forming spots with desired diameters in a sequential and stable manner on a biochip support, such as a slide glass or a nylon membrane.

The above object is achieved by a spotting pin according to the invention in which the head of the pin in which a solution is held is shaped in an advantageous manner.

In one aspect, the invention provides a spotting pin comprising a bar-like body and four projections formed on the head of the body, each of the projections formed in the shape of a top portion of a quadrangular pyramid. The apexes of the quadrangular pyramids constituting the projections are located inside a virtual plane extended from the peripheral wall of the body. This spotting pin makes it possible to spot a spotting solution containing biomolecules on a support, such as a slide glass or a nylon membrane, sequentially and stably, and to obtain spots of identical shape.

The tip of each quadrangular pyramid constituting a projection is preferably cut to be in a plane perpendicular to the central axis of the body. By thus cutting the tip, the possibility of the spotting pin and/or the support being damaged when the former comes into contact with the latter can be reduced.

Of a plurality of wall surfaces possessed by two adjacent projections, the two wall surfaces located toward the center of the body are in a first common plane, while the two wall surfaces located farther from the center of the body are in a second common plane.

The first common plane preferably intersects a plane perpendicular to the central axis of the body at an angle of between 30° and 60°. The second common plane preferably intersects the plane perpendicular to the central axis of the body at an angle of between 30° and 60°. The wedge angle formed by the first and second common planes is preferably in the range of 60° and 120°. The distance between the apexes of quadrangular pyramids constituting adjacent projections may be in the range of 50 to 250 $\mu$m.

The biomolecules that can be spotted by the spotting pin of the invention are not limited to DNA. The inventive spotting pin can be used in spotting any kind of biomolecule, such as RNA, proteins, or mixtures thereof, on a support such as a slide glass or a nylon membrane.

DESCRIPTION OF THE INVENTION

The invention will be hereafter described by way of embodiments with reference made to the drawings.

Figure 1A:
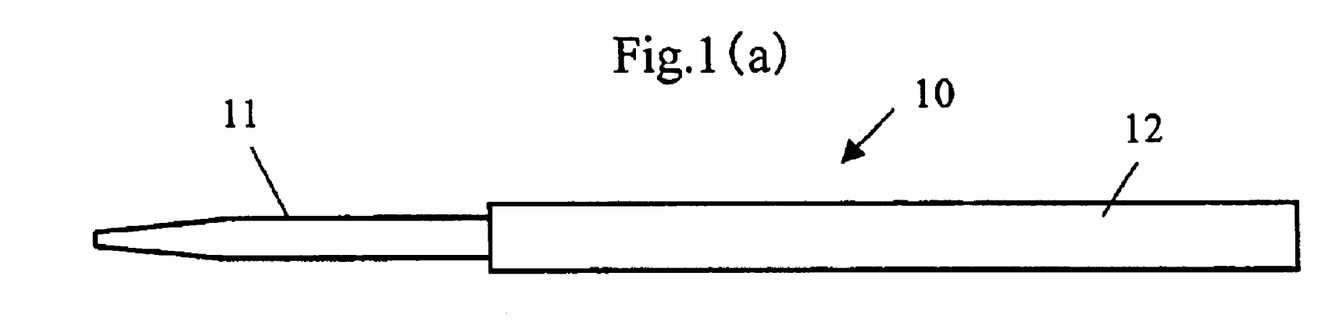
FIGS. 1(a) and 1(b) show an overall structure of the spotting pin according to the invention.
Figure 1B:
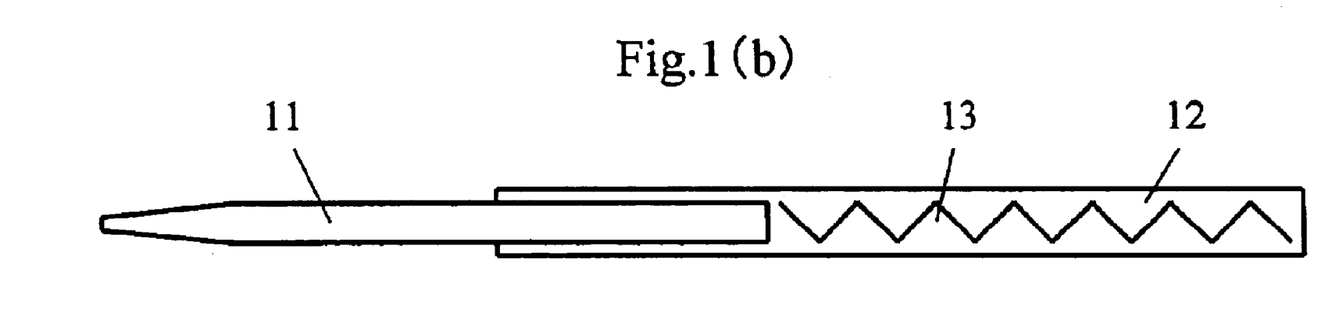

FIGS. 1(a) and 1(b) show the overall structure of a spotting pin 10 according to the invention. FIG. 1(a) is a side view, and FIG. 1(b) is a cross-sectional view. The spotting pin 10 comprises a rod-shaped plunger 11, to the head of which a solution is attached, and which is stamped onto a biochip support. It also comprises a cylindrical barrel 12 with a closed bottom, into which a rear end of the plunger 11 is inserted, and a spring 13 disposed inside the barrel 12 for pushing the rear end of the plunger 11. A spot is formed on the support by bringing the head of the plunger 11, to which a spotting solution has been attached, into contact with the support, and then pushing the barrel 12 toward the support against the force of the spring 13.

By forming the plunger 11 with austenitic stainless steel, increased strength as well as acid and chemical resistance can be obtained. By diamond-coating the inside of the barrel 12 and minimizing the force of the spring 13, smooth movement of the plunger can be obtained, and the pressure with which the slide glass or nylon membrane is stamped for spotting can be minimized. This helps prevent the deterioration of the spotting pin, making it possible to form identically shaped spots in a sequential and stable manner.

Figure 2:
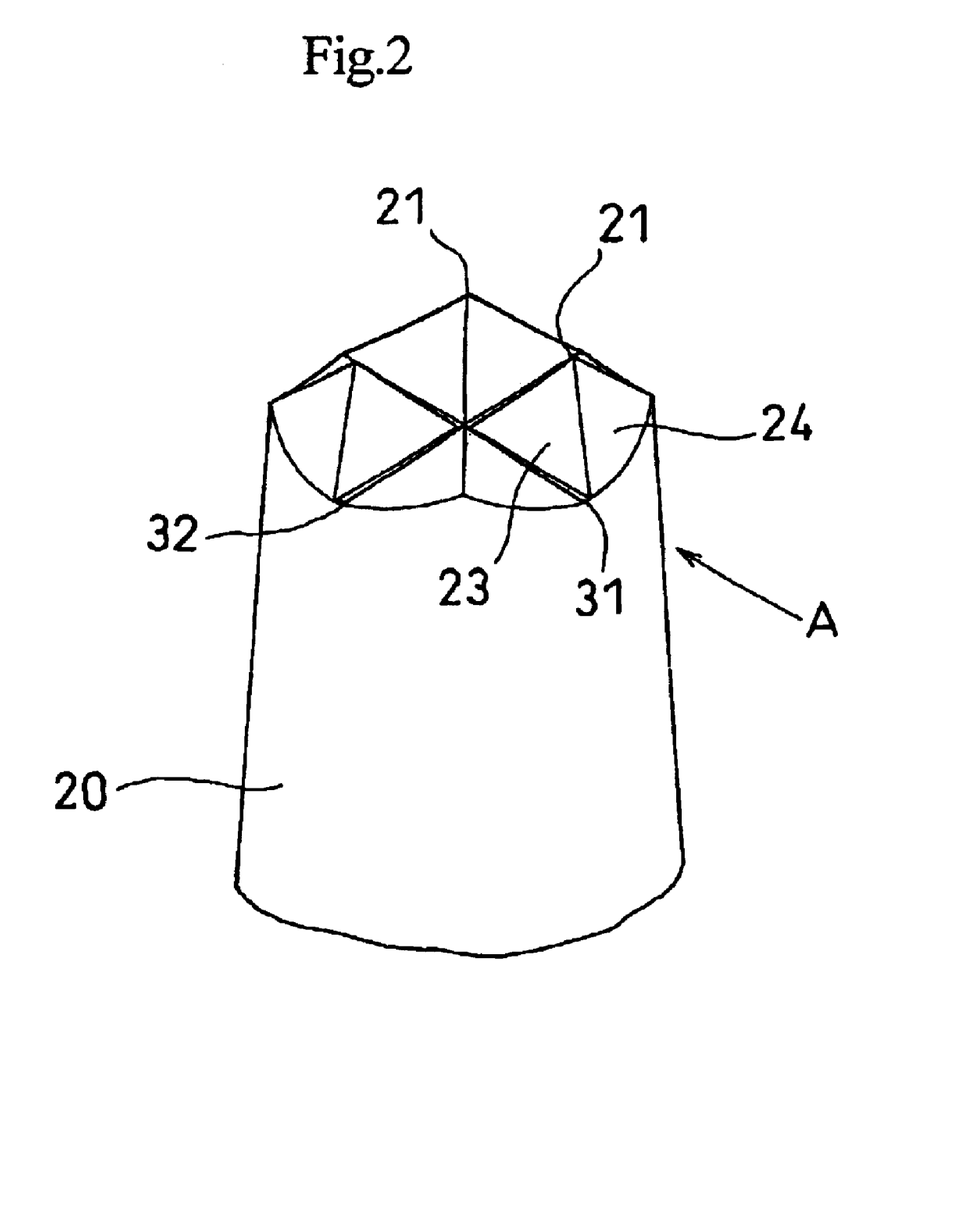
FIG. 2 shows a perspective view illustrating the shape of the head of a W-cut pin according to the invention.
Figure 3:
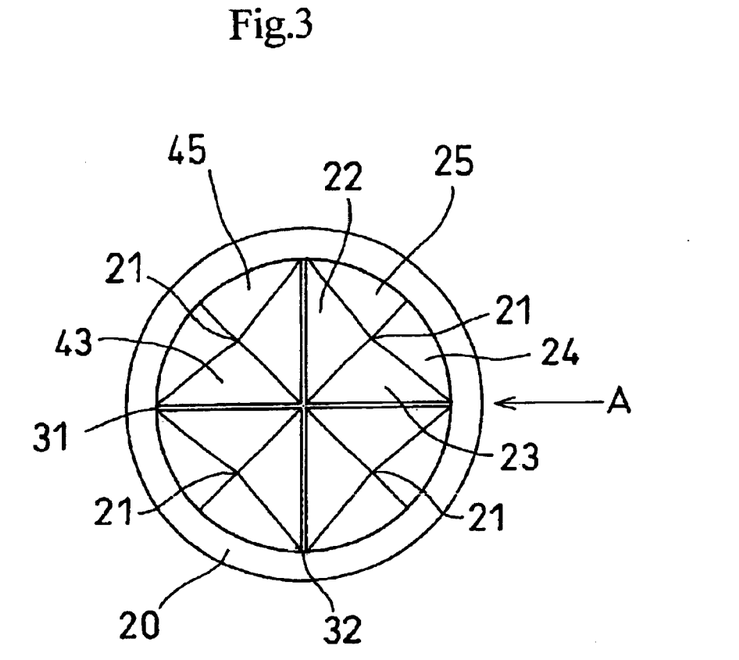
FIG. 3 shows a top view of the head of the W-cut pin according to the invention.
Figure 4:
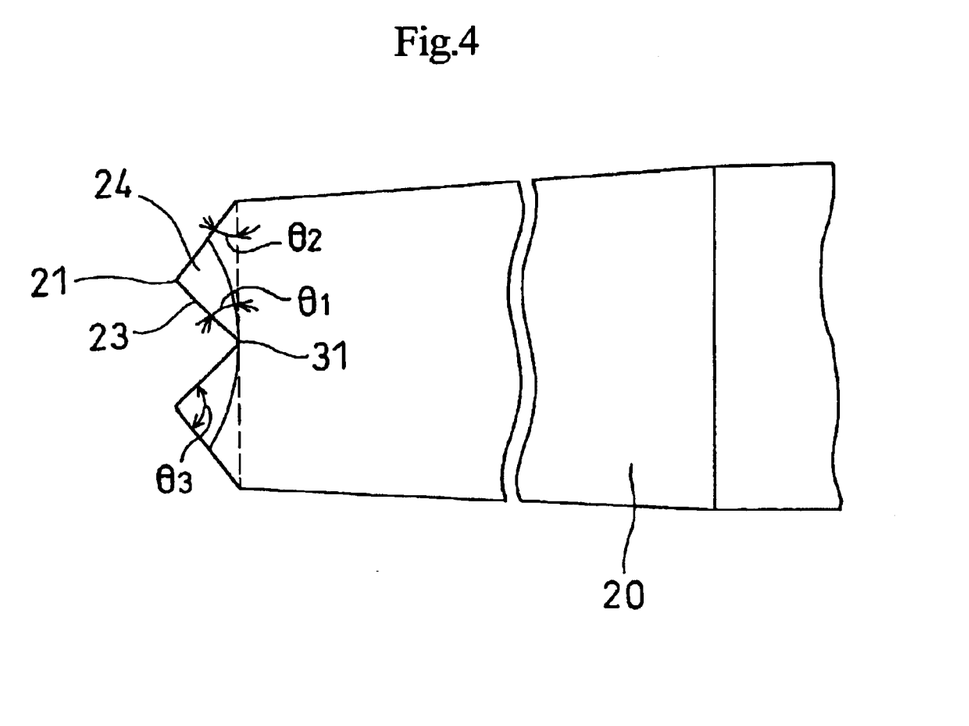
FIG. 4 shows a side view of the W-cut pin as seen from the direction of an arrow A.

Referring to FIGS. 2, 3, and 4, the shape of an example of the spotting pin according to the invention (to be hereafter referred to as a W-cut pin) will be described. FIG. 2 shows a perspective view illustrating the head of the W-cut pin. FIG. 3 shows a top view of the head of the pin. FIG. 4 shows a side view of the pin as seen from an arrow A shown in FIGS. 2 and 3. The W-cut pin includes four independent quadrangular-pyramidal projections. They are formed by first cutting four independent triangular-pyramidal projections by cutting two V-shaped grooves across each other on the head of the substantially cylindrical plunger 20. Then, the outside of the four triangular-pyramidal projections is diagonally cut in a plane inclined with respect to the V-shaped grooves. The four quadrangular-pyramidal projections formed on the head of the plunger 20 are thus divided from one another by the two V-shaped grooves. Each projection includes an apex 21, two planes 22 and 23 forming two inclined surfaces of the two V-shaped grooves perpendicular to one another, a plane 24 slicing diagonally one V-shaped groove 31, and a plane 25 slicing diagonally the other V-shaped groove 32.

Two adjacent projections, such as the upper-right projection (a first projection) and the upper-left projection (a second projection) in FIG. 3, will be considered. A wall surface 23 of the first projection and a wall surface 43 of the second projection form one of the two walls of the same V-shaped groove 31 and are therefore coplanar. A wall surface 25 on the periphery of the first projection and a wall surface 45 on the periphery of the second projection are cut diagonally with respect to the V-shaped groove 32 and are therefore coplanar. The individual wall surfaces of the other two adjacent projections also have similar relationships to the wall surfaces 23 and 25 of the first projection and the wall surfaces 43 and 45 of the second projection.

A plane formed by the wall surfaces 23 and 43 intersects a plane perpendicular to the central axis of the plunger 20 with an angle $\theta_1$. In the present embodiment, the angle $\theta_1$ is about 45°. The angle should preferably be in the range of 30° to 60°. When $\theta_1$ is less than 30°, a sufficient amount of solution cannot be attached to the pin head. When greater than 60°, the solution attached to the pin head cannot be stamped onto the support in a proper manner.

A plane formed by the wall surfaces 25 and 45 intersects a plane perpendicular to the central axis of the plunger 20 with an angle $\theta_2$. In the present embodiment, the angle $\theta_2$ is about 45°. The angle should preferably be within the range of 30° to 60°. If the angle is less than 30° or more than 60°, circular spots cannot be stably obtained.

In the present embodiment, a wedge angle $\theta_3$ formed by a first common plane and a second common plane is about 90°. The angle $\theta_3$ should preferably be in the range of 60° to 120°. If the angle is less than 60°, durability may be compromised. If the angle is greater than 120°, relatively circular spots may not be obtained.

In the present embodiment, the distance between the apexes of quadrangular pyramids constituting adjacent projections is 100 µm. The distance may be appropriately set within the range of 50 to 250 µm, depending on the desired size of spots.

Figure 5:
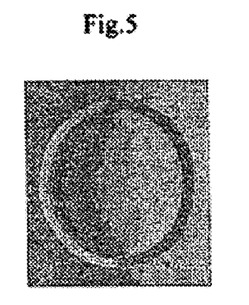
FIG. 5 shows a spot formed with the W-cut pin according to the invention.

When a DNA solution was spotted using the above-described W-cut pin, circular spot were obtained in a sequential and stable manner, as shown in FIG. 5. As the tip angle of the projections is obtuse as compared with a V-cut pin, the spotting pin is less likely to break. Further, the W-cut pin does not have to be as narrow toward its head as the V-cut pin, so that its machining is easier.

Figure 6A:
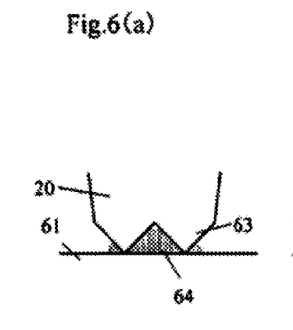
FIGS. 6(a) and 6(b) show states of DNA solution held by spotting pins when the head of each spotting pin is in contact with a biochip support.
Figure 6B:
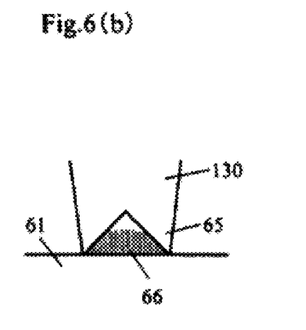

A spot formed with a V-cut pin is likely to be deformed into a rectangle whereas a spot formed with the W-cut pin is circular. This is believed to result from the following reasons. FIGS. 6(a) and 6(b) schematically show the states of DNA solution held by the spotting pin when its head is in contact with a biochip support 61. FIG. 6(a) shows the W-cut pin of the invention. FIG. 6(b) shows a conventional V-cut pin 130.

As shown in FIG. 6(b), the conventional V-cut pin 130 spots the DNA solution 66 on the support 61 while holding the solution inside the four projections 65 at its pin head. As a result, the spot shape tends to extend from the four apexes of the projections 65, creating a rectangular spot as shown in FIG. 14. On the other hand, in the W-cut pin according to the invention, the DNA solution 64 exists outside as well as inside the four projections 63 of the W-cut pin 20, as shown in FIG. 6(a). Thus, the W-cut pin 20 can create a relatively circular spot on the support 61, as shown in FIG. 5.

Figure 7:
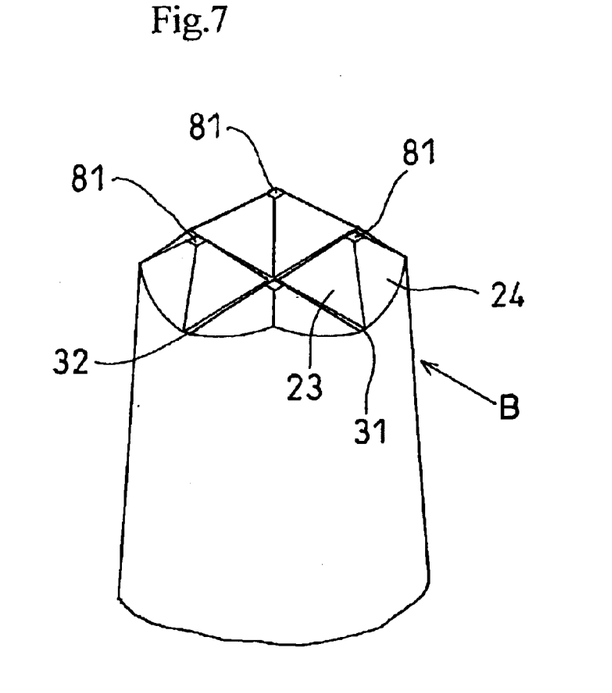
FIG. 7 shows a perspective view illustrating the shape of the head of a W flat-cut pin according to the invention.
Figure 8:
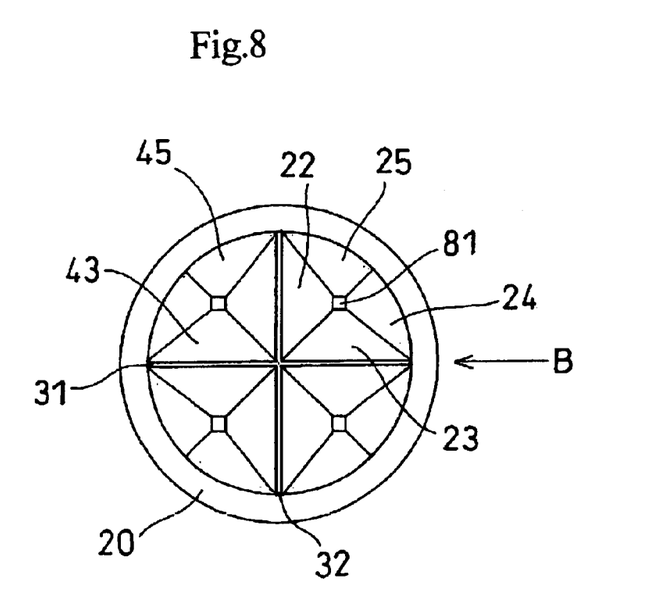
FIG. 8 shows a top view of the head of a W flat-cut pin according to the invention.
Figure 9:
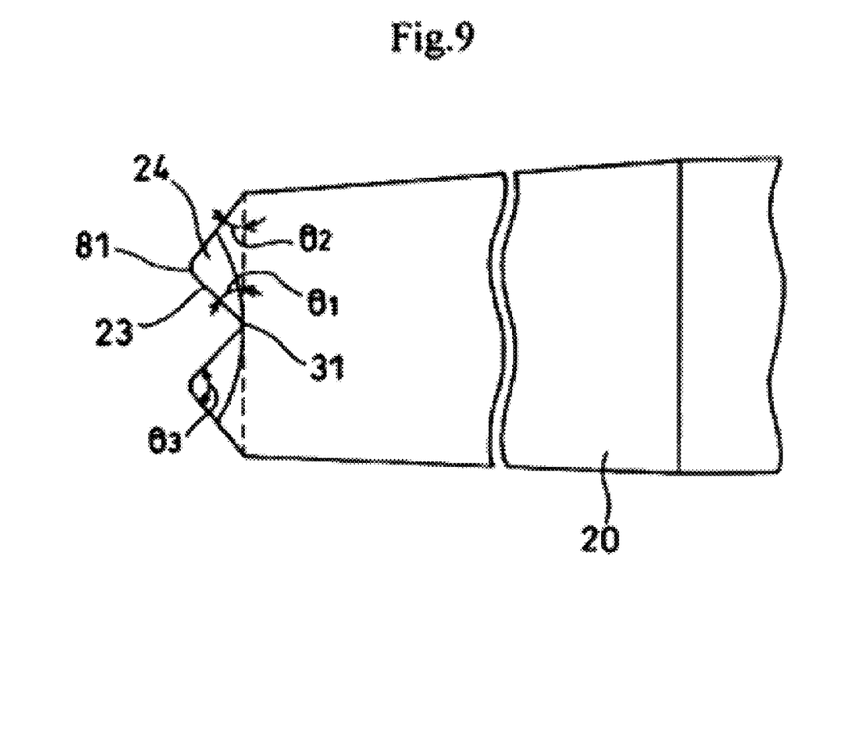
FIG. 9 shows a side view of the W flat-cut pin as seen from the direction of an arrow B.
Figure 10:
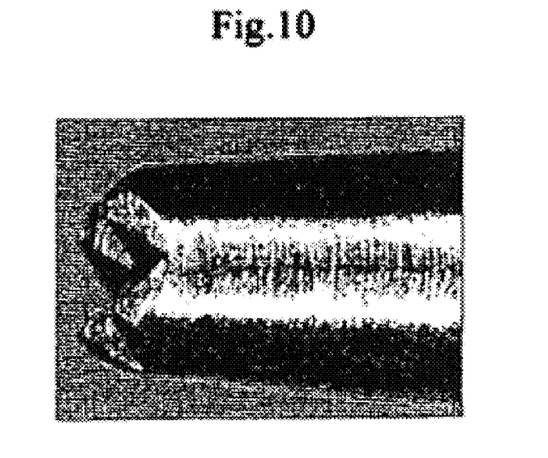
FIG. 10 shows a photograph of the head of the W flat-cut pin according to the invention.

Now referring to FIGS. 7 to 10, another embodiment ("W flat-cut pin") of the spotting pin according to the invention will be described. The W flat-cut pin is a modification of the W-cut pin in which the head is additionally cut in parallel to the contact plane. FIG. 7 shows a perspective view of the head of the W flat-cut pin. FIG. 8 shows a top view of the pin head. FIG. 9 shows a side view as seen from the direction of an arrow B. FIG. 10 shows a photograph of the head of the W flat-cut pin. In FIGS. 7 to 9, parts similar to those shown in FIGS. 2 to 4 are designated by similar numerals to avoid redundancy.

In the W-cut pin, each apex of the quadrangular pyramids constituting the four projections formed on the pin head is sharply pointed. In the W flat-cut pin, on the other hand, the apex of each projection is shaved and blunted. Thus, because projection tips 81 of the W flat-cut pin are parallel to the contact surface (i.e., a plane perpendicular to the central axis of the plunger), damage to the projections can be prevented when the pin head comes into contact with the support. Further, the W flat-cut pin can be used in forming spots on a film-like support such as a nylon membrane, which may cause problems when the pin head is sharply pointed.

Figure 11:
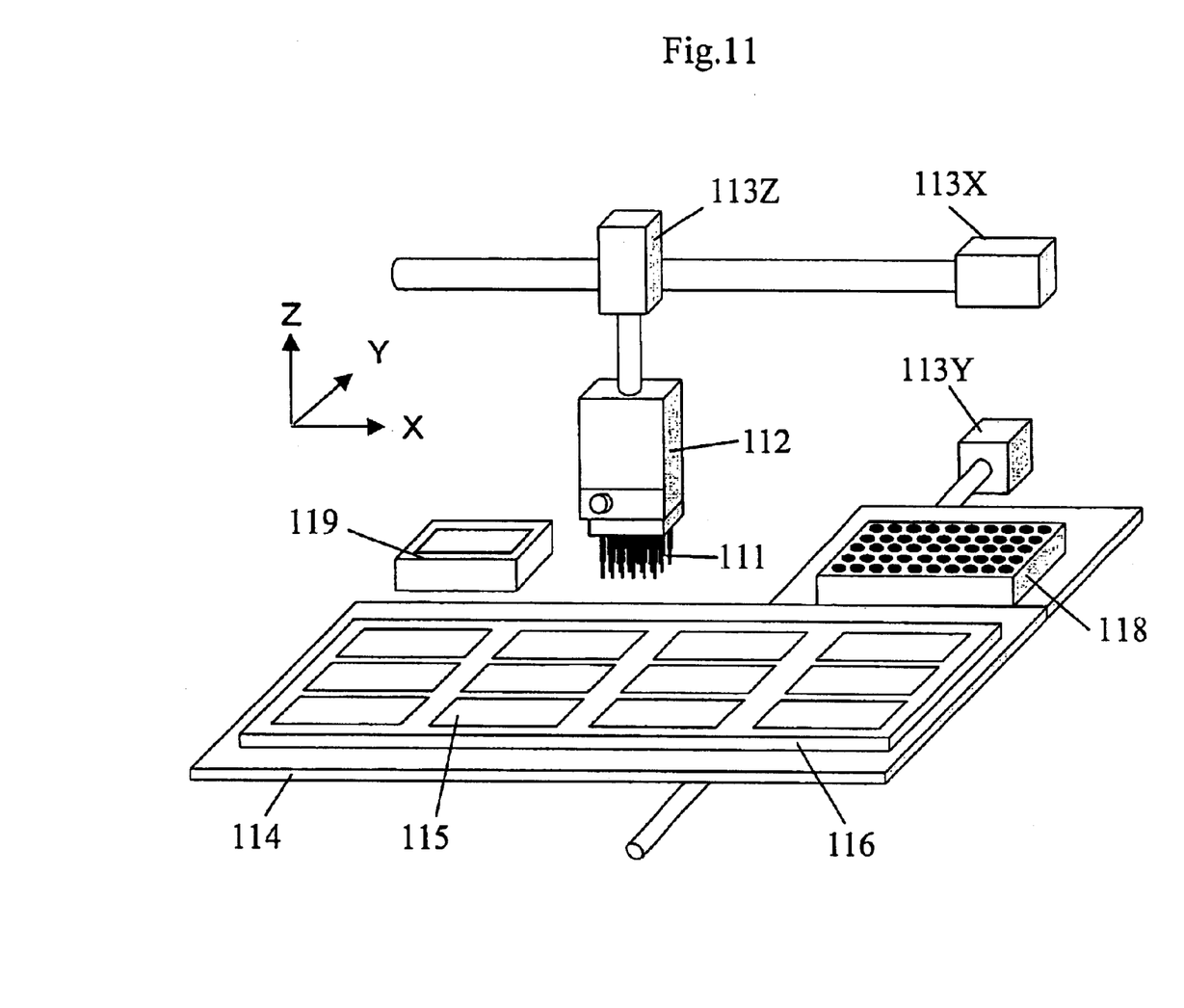
FIG. 11 shows an example of spotting equipment.

FIG. 11 shows an example of spotting equipment for manufacturing a biochip by spotting a DNA solution or the like on a support using the spotting pin. The spotting equipment comprises a pin head 112 on the underside of which spotting pins 111 are mounted, an X-motor 113X for driving the pin head 112 in an X-axis direction, a Z-motor 113Z for driving the pin head in a Z-axis direction, a base 114, and a Y-motor 113Y for driving the base 114 in a Y-direction. On the base 114 is mounted a stage 116 carrying a plurality of biochip supports 115 such as, for example, slide glasses or nylon membranes. A microplate 118 containing solutions of biomolecules such as multiple kinds of DNA, for example, is also mounted on the base 114. As the spotting pins 111, the type of spotting pin according to the invention as described above is used.

The X- and Z-direction positions of the pin head 112 are accurately controlled by the X- and Z-motors 113X and 113Z, respectively. The Y-direction position of the base 114 is accurately controlled by the Y-motor 113Y. As a result, equal amounts of the multiple kinds of biomolecule solutions can be sequentially spotted on a plurality of supports 115. When a separate kind of biomolecule solution contained in the microplate 118 is to be sequentially spotted using the same spotting pins, the spotting pins are washed in a pin washing apparatus 119 prior to charging the next biomolecule Solution into them in order to prevent contamination of the solution. The washing is carried out using a combination of ultrasonic washing and vacuum drying. Specifically, the pins are once vacuum-dried after use, washed with ultrasonic, and then vacuum-dried once again. This prevents contamination of the solution and makes it possible to sequentially spot multiple kinds of biomolecule solutions on the support 115.

Thus, in accordance with the invention, spotting solutions containing biomolecules, such as multiple kinds of DNA, RNA, or proteins, can be spotted on a support such as a slide glass or a nylon membrane sequentially and stably, and spots with a desired shape can be obtained.

What is claimed is:

1. A spotting pin comprising a rod-shaped body and four projections formed on the head of the body, each of the projections formed in the shape of a top portion of a quadrangular pyramid, wherein the apexes of the quadrangular pyramids constituting the projections are located inside a virtual plane extended from the peripheral wall of the body.

2. The spotting pin according to claim 1, wherein the tip of each of the quadrangular pyramids constituting the projections is cut to be in a plane perpendicular to a central axis of the body.

3. The spotting pin according to claim 1, wherein of a plurality of wall surfaces possessed by two adjacent projections, two wall surfaces located toward the center of the body are in a first common plane, whereas two wall surfaces located farther from the center of the body are in a second common plane.

4. The spotting pin according to claim 3, wherein the first common plane intersects a plane perpendicular to the central axis of the body at an angle in the range of 30° to 60°.

5. The spotting pin according to claim 3, wherein the second common plane intersects a plane perpendicular to the central axis of the body at an angle in the range of 30° to 60°.

6. The spotting pin according to claim 3, wherein the first and second common planes form a wedge angle that is in the range of 60° to 120°.

7. The spotting pin according to claim 1, wherein the distance between the apexes of quadrangular pyramids constituting adjacent projections is in the range of 50 to 250 μm.

8. The spotting pin according to claim 1, wherein the body is made of austenitic stainless steel.

* * * * *